May 18, 1926.

V. LINK 1,585,396

STEERING KNUCKLE LUBRICATION

Filed Sept. 20, 1922

INVENTOR
*VINCENT LINK*
BY
*William MacGlashan*
ATTORNEY

Patented May 18, 1926.

1,585,396

UNITED STATES PATENT OFFICE.

VINCENT LINK, OF DETROIT, MICHIGAN, ASSIGNOR TO THE STUDEBAKER CORPORATION, A CORPORATION OF NEW JERSEY.

STEERING-KNUCKLE LUBRICATION.

Application filed September 20, 1922. Serial No. 589,342.

This invention relates to means for lubricating knuckle bearings and the like, particularly the steering knuckle bearings of automobiles.

It has been found very difficult to retain lubricating oil in the bearings of knuckles for any great length of time, the oil working out in a relateivly short length of time leaving the bearing dry and subject to rapid wear.

The object of my present invention consists of means for lubricating these bearings in such a manner that a well of oil is provided for each bearing to run in, the construction being such that any leakage of oil from the wells, if any, will be exceedingly small.

Other objects of the invention will definitely appear from the drawings and the detailed description of the same, and the invention is more particularly defined in the appended claims.

In the drawings, the same reference numerals designate similar parts throughout the several views, in which.

Figure 1:
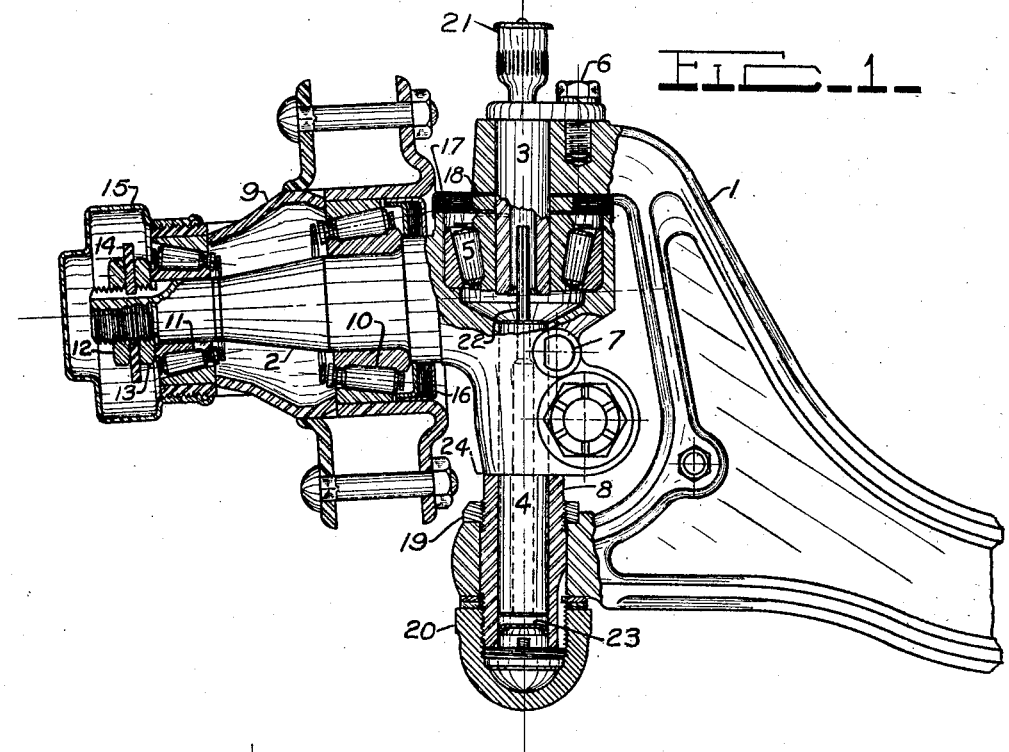
Figure 1 is a side elevational view of an automobile steering knuckle and its connection to an automobile axle, certain of the parts being shown in section to more clearly show my invention.
Figure 2:
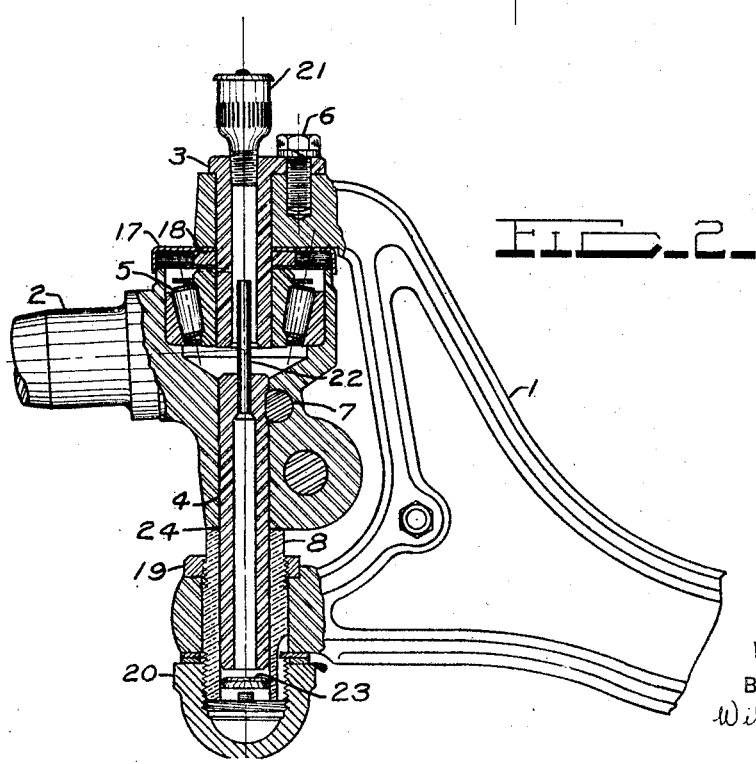
Figure 2 is a similar view, but showing the steering knuckle and oil ducts in section to more clearly define the manner in which the bearings are lubricated.

Referring to the numbered parts of the drawing, the front axle 1 of an automobile is provided with a forked steering head in which are formed bearings wherein the wheel spindle 2 is pivotally mounted by means of the hollow pins or pivots 3 and 4. The pin 3 which forms the upper pivot for the wheel spindle 2 is mounted at its lower end in a tapered roller bearing 5 which is set in a cup formed in the upper end of the spindle 2, and is held against rotation in its bearing because of its enlarged head having an opening therein through which the bolt 6 can be inserted and screwed into the axle 1. The lower hollow pin 4 which is adapted to firmly fit in the wheel spindle 2 is secured against rotation therewith by the pin 7 and therefore pivots in its bearing in the adjustable bushing 8 which may be threaded into the lower fork at the end of the axle 1.

A wheel hub 9 rotatably mounted on the roller bearings 10 and 11, is secured against longitudinal movement on the wheel spindle 2 by means of the nut 13, lock nut 12, and washer 14. A dust cap 15 secured to the outer end of the wheel hub 9 prevents dirt and foreign matter from entering the bearing 11, and a dust washer 16 secured in the inner end of the wheel hub 9 protects the bearing 10. A dust ring 17 is positioned between the bearing 5 and upper forked portion of the axle to protect the bearing from dirt and foreign matter, and a steel ring 18 is provided within the dust ring 17 to transmit the thrust from the bearing 5 to the axle. Adjustment for the bearing 5 is accomplished by adjustment of the bushing 8 in the lower forked end of the axle 1, and the bushing 8 is retained in its adjusted position by the nuts 19 and 20.

The method of lubricating the roller bearing 5 and the surface between the pin 4 and bushing 8 to which this invention relates, is accomplished as follows:

The upper pin 3 is provided with a relatively large central opening therethru at the top of which an oil cup 21 is attached. The lower pin 4 is also provided with a central opening into the top of which is securely inserted a tube 22 which projects up into the opening of the pin 3 to a point of approximately the same height as the top of the rollers of the roller bearing 5, and which leaves ample space between it and the walls of the opening in the pin 3 to allow the free passage of oil therethru. The lower end of the pin 4 does not extend down as far as the end of the bushing 8. Within the bore of the bushing 8 below the end of the pin 4 is placed a plug 23 which prevents passage of oil thereby. Oil introduced into the cup 21 flows down thru the central opening in the pin 3 immersing the bearing 5 and also flows down thru the tube 22 into the central opening of the pin 4 and down to the plug 23. The joints between the tube 22 and the pin 4 and between the pin 4 and spindle 2 are oil tight thus making the top of the tube 22 the lowest point from which oil may escape from the cup in the spindle in which the roller bearing seats. The oil that passes down thru the tube 22 lubricates the surface between the pin 4 and bushing 8, the lower end of which is sealed, leaving the joint 24 between the upper end of the bushing 8 and the spindle 2 the lowest point from which oil may escape from the lower bearing. It will thus be seen that the bearings for the wheel spindle are lubricated from a single source of supply, and that the cosntruction as illustrated provides an oil well in which the level of oil is as high as the top of the bearing to be lubricated. This forms a lubricating system for the bearings, wherein the bearings are always submerged in oil and in which there is no danger of their running dry and which requires little attention as the oil well is of sufficient size to hold the lubricant required for a long period of time.

Formal changes may be made in the specific embodiment of the invention described without departing from the spirit or substance of the broad invention, the scope of which is commensurate with the appended claims.

What I claim is:—

1. In a wheel mounting, an axle, a wheel spindle pivotally mounted therein, hollow pivot pins connecting said axle and said wheel spindle, one of said pivot pins being secured to said axle and the other to said spindle, each of said pivot pins being positioned to provide an oil reservoir below the same, a tube secured in one of said pivot pins and extending into the other of said pivot pins whereby said pivot pins may be lubricated from a single source of oil supply and oil will not be drawn from one reservoir to the other.

2. In combination with a movable member pivotally connected to a stationary member by an upper hollow pin and a lower hollow pin, a bearing in said movable member for said upper hollow pin, a blind bearing in said stationary member for said lower hollow pin, a tubular member secured within the upper end of said lower hollow pin and extending upwards within said upper hollow pin, and means to lubricate said bearings.

3. In a wheel mounting, an axle having a wheel spindle pivotally attached thereto, hollow pivot pins forming such connection, one of said pivot pins being secured to said axle and the other to said spindle, one of said pivot pins having an oil inlet therein, and a tube secured in the other of said pivot pins and extending into said oil inlet whereby the bearing surfaces of said pivot pins may be lubricated from said oil inlet, said tube delivering oil to the pivot pin bearing independent of the oil delivered to the pivot pin bearing receiving oil directly from said oil inlet.

4. In combination with an axle of a vehicle, a spindle for a wheel pivotally secured to said axle by an upper pin and a lower pin, said upper pin non-rotatably secured in said axle and having a bearing in a recess in the upper part of said spindle, said lower pin being non-rotatably secured to said spindle and turning in a bearing in said axle, and means to lubricate said bearings comprising an opening in said upper pin and a tube in said lower bearing extending into said opening whereby lubricant is supplied to said lower bearing from a point above said upper bearing.

5. In combination with a vehicle axle having a wheel spindle pivotally attached thereto by an upper pin and a lower pin, said pins having central openings therein, said upper pin non-rotatably secured in said axle, a bearing for said upper pin in a cup-like recess in said spindle, said lower pin non-rotatably secured in said spindle and provided with a bearing in a blind bushing in said axle, a tube fitting into the central opening of said lower pin and extending upward within the central opening of said upper pin to a point approximately level with the top of the bearing surface of the bearing for said upper pin, and means for admitting lubricant to said bearings.

6. In a wheel mounting, an axle, a wheel spindle, hollow pivot pins connecting said axle and said wheel spindle, one of said pivot pins being secured to said axle and the other to said spindle, each of said pivot pins having an oil reservoir at the bottom thereof, a passage connecting said reservoirs, and means within one of said reservoirs to prevent the escape of oil below a predetermined level therein into the other of said reservoirs.

7. In a wheel mounting, the combination of an axle, a wheel spindle, a pivot pin rotatably mounted in said wheel spindle, a second pivot pin fixed against rotation in said wheel spindle, said pivot pins forming the hinge connection between said axle and wheel spindle, and means comprising an oil inlet and a tube extending into said oil inlet for lubricating the bearing surfaces of said pivot pins from a single source of oil supply, said tube preventing the escape of lubricant from the bearing of said pivot pin rotatably mounted in said spindle at a point below said pivot pin.

8. In a wheel mounting, the combination of a wheel spindle, an axle, means connecting said spindle and said axle comprising a pivot pin non-rotatably mounted in said spindle and a pivot pin rotatably mounted in said spindle, a bearing in said axle for said first-named pivot pin, a bearing in said wheel spindle for said second pivot pin, and means within said first-named pivot pin to prevent lubricant from escaping from the reservoir below said second named bearing to said first bearing.

9. In a device of the character described, an axle provided with a steering knuckle pivot, a steering knuckle mounted on said pivot, a thrust bearing between said axle and said knuckle, said steering knuckle being provided with an oil reservoir at the lower end of said pivot, a pivot member secured to and extending downwardly from said knuckle and provided with an oil reservoir, and means for supplying oil to said reservoirs from a single source of supply at a point above the level of said thrust bearing, said first named reservoir being in communication with said thrust bearing so that said thrust bearing may be lubricated from said reservoir by splash when the oil level is below said bearing.

10. In a device of the character described, an axle provided with a steering knuckle pivot, a steering knuckle mounted on said pivot, a thrust bearing between said axle and said knuckle, said steering knuckle being provided with an oil reservoir at the lower end of said pivot, a pivot member secured to and extending downwardly from said knuckle and provided with an oil reservoir, and an oil cup for supplying oil to said reservoirs from a single source of supply at a point above the level of said thrust bearing.

Signed by me at Detroit, Michigan, U. S. A., this 5th day of September, 1922.

VINCENT LINK.